UNITED STATES PATENT OFFICE.

ARTHUR GEORGE GREEN AND KENNETH HERBERT SAUNDERS, OF MANCHESTER, ENGLAND, ASSIGNORS TO BRITISH DYESTUFFS CORPORATION LIMITED, OF MANCHESTER, ENGLAND.

MANUFACTURE OF N-SULPHATO-ALKYL COMPOUNDS.

No Drawing. Application filed November 29, 1921. Serial No. 518,569.

*To all whom it may concern:*

Be it known that ARTHUR GEORGE GREEN and KENNETH HERBERT SAUNDERS, subjects of the King of Great Britain and Ireland, residing at Crumpsall Vale Chemical Works, Blackley, Manchester, England, have invented new and useful Improvements in the Manufacture of N-Sulphato-Alkyl Compounds, of which the following is a specification.

This invention relates to the manufacture of a new class of chemical substances, namely, N-sulphato-alkyl compounds. These bodies are characterised by the presence in their structure of an alkyl sulphuric acid group attached to nitrogen, for instance, N—$C_2H_4$—$SO_4H$ and upon boiling with caustic alkalies the $SO_4H$ group is split off as an alkaline sulphate and the corresponding oxy-alkyl compound is produced.

It is well known that for normal dyeing, colouring matters have to be applied in the dye-bath in some soluble form. The most usual and generally employed method of converting insoluble or insufficiently soluble colouring matters into soluble dyestuffs has been by sulphonation, that is to say, by the introduction of one or more sulphonic acid groups ($SO_3H$) into the hydrocarbon nucleus. This method was first applied to the vegetable colouring matter indigo, this insoluble colouring matter being thus converted into a soluble dye (indigo carmine) which dyes animal fibres from an acid bath. Later the basic coal-tar colouring-matters, spirit blue and magenta were converted by sulphonation into the acid colouring-matters soluble blue and acid magenta.

Insoluble azo dyes were also converted into soluble acid colouring matters by sulphonation, and it was then recognised that in the manufacture of azo dyes and of dyes of other classes the sulphonic acid group could be introduced into the components or intermediate products instead of into the finished colouring-matter.

We have now discovered a new class of dyestuffs which dye wool and silk from an acid bath, and which owe their solubility and "acid" character to the presence in their structure of the alcoholic sulphuric acid group $C_2H_4.SO_4H$ attached to nitrogen. This $SO_4H$ group we term the "Sulphato" group, both in the free state and in the form of its salts.

The introduction of the sulphato group into the structure of colouring matters can be effected in even more varied ways than those which we have mentioned above as being in ordinary use for the introduction of the sulphonic group.

Thus the sulphato group can be introduced not only into the finished colouring matter or into a component used for the production of the same, or into both, but there is a third alternative. The oxyethyl-residue (—$C_2H_4OH$) can be introduced by means of ethylene chlorhydrin into an intermediate product and this converted into a colouring matter containing this group, and then the sulphato group formed as hereinafter described.

We have thus discovered a new principle, by the use of which soluble acid colouring matters—the "sulphato" colouring matters—can be obtained, and in carrying out this invention we produce a new series of intermediates, and a new series of colouring matters, and we intend to claim all these new series of both sets of products. We do not claim in this application the new oxy-alkylated colouring matters and intermediate compounds before they are converted into sulphato compounds.

When ethylene chlorhydrin is the chlorhydrin employed, the new series of intermediate products have the general structure:—

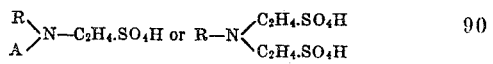

in which R indicates an aromatic residue (or substituted aromatic residue) and A stands for a hydrogen atom, alkyl, oxyalkyl, aralkyl, or aryl group. The above formulæ are for mono-amino derivatives, but the sulphato group can be introduced twice or more times into a colouring matter or intermediate compound, such as an ortho-, meta-, or para-diamine, in these latter cases giving intermediate sulphato acids of the types:—

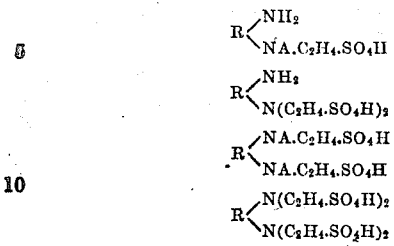

The new sulphato compounds are obtained by the action of concentrated sulphuric acid upon oxyethyl derivatives of aromatic amines and diamines, for instance upon bodies of the following types, but the invention is not confined to these instances:—

Oxyethylaniline, $C_6H_5.NH(C_2H_4.OH)$

Dioxy-diethylanilines, $C_6H_5.N(C_2H_4.OH)_2$

Oxyethyl-ethyl (or methyl) aniline, $C_6H_5.N(C_2H_5)C_2H_4.OH$ or $C_6H_5.N(CH_3)(C_2H_4.OH)$ Oxyethyl-o-toluidine, $C_7H_7.NH(C_2H_4.OH)$ Oxyethyl-benzylaniline.

Oxyethylated alpha- or beta-naphthylamine.

Oxyethylated ortho-, meta- and para-diamines.

Oxyethylated aminophenols and aminonaphthols.

These oxyethyl derivatives (some of which are known, having been described in the German Patent No. 163043, whilst others are new) are obtained by the reaction in aqueous or alcoholic solution of ethylene chlorhydrin upon primary or secondary amines or diamines of the aromatic or fatty aromatic series, or their derivatives.

For the preparation of sulphato acids it is only necessary to treat the above or similar oxyethyl derivatives with concentrated sulphuric acid or such stronger acid as under the conditions employed will give a compound completely soluble in aqueous alkalies. The conditions employed are such as would normally convert ethyl-alcohol into hydrogen ethyl-sulphate. The sulphuric acid may be replaced by fuming sulphuric acid, chlorsulphonic acid, or other agent known to be the equivalent of sulphuric acid in converting alcohols into alkyl hydrogen sulphates.

The introduction of the sulphato group into the finished dyestuff is effected by first preparing colouring-matters derived from oxyethyl components, which are themselves in most cases new products, and then treating such oxyethylated colours with concentrated sulphuric acid.

The preparation of the parent basic dyestuffs from such oxyethyl components is effected in a manner quite analogous to that of the corresponding dyestuffs from ethyl-aniline, diethylaniline, ethyl-o-toluidine, ethyl - alpha - naphthylamine, ethyl - beta-naphthylamine, dialkyl - m - phenylenediamine, dialkyl-p-phenylene-diamine, etc.

The conversion of the basic dyestuffs obtained therefrom into the "sulphato" acids is effected by treatment with such strength of sulphuric acid and under such conditions of concentration and temperature as would normally convert ethyl-alcohol into hydrogen ethyl sulphate. Sulphato acids may be obtained by both methods in all classes of colouring-matters in which colouring matters can be obtained from the corresponding ethyl derivatives. Thus, sulphato azo dyestuffs can be prepared either by use of sulphato acids or their salts in the combination, or by treatment with sulphuric acid of the finished colouring matter, or by such treatment of intermediate bodies containing oxyethyl groups. In the like manner sulphato triphenylmethane dyestuffs can be obtained by condensation from formaldehyde, benzaldehyde or substituted benzaldehydes. Again, all the types of colouring matters which can be obtained from nitroso compounds by condensation with amines, phenols or amino-phenols can be prepared from nitroso sulphate acids; or an oxyethylated azine, oxazine or thiazine colour can be converted into the sulphato acid.

A still further method of producing these dyestuffs or dyestuff components consists in first preparing the chlorethyl hydrogen sulphate $(C_2H_4Cl.SO_4H)$ by dissolving ethylene chlorhydrin in concentrated sulphuric acid, and reacting with this substance in a neutral or alkaline solution on a dyestuff component, dyestuff intermediate or dyestuff, containing a primary or secondary amino group. In this way the sulphato-ethyl group—$C_2H_4.SO_4H$—is introduced in one step.

We have hereinbefore referred to the sulphato group attached to an ethyl residue, but in all cases in which the oxyethyl group is introduced into the molecule by the use of ethylene chlorhydrin, we have found that other chlorhydrins can be used in the same way. Thus, by the use of propylene chlorhydrin—

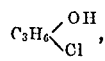

or of butylene chlorhydrin—

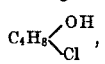

an oxy-propyl-group or an oxybutyl group can be introduced into the molecule of an intermediate or finished dyestuff and by treatment with sulphuric acid the sulphato-propyl group or the sulphato-butyl group is formed. The chlorhydrins of glycerol, namely:—

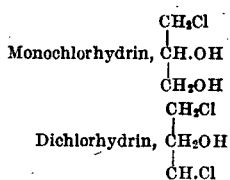

and

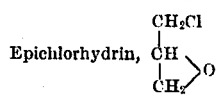

can be used in an analogous manner.

Although our process is directed towards obtaining solubility and acid properties by the introduction of the sulphato group, whilst heretofore the sulphonic group has been used for this purpose, still the use of the sulphato group does not make it impossible to introduce the sulphonic group at the same time; by which means useful sulphato compounds of sulphonated bodies can be obtained.

Again, although we have mentioned the dyeing of wool and silk from the acid bath as characteristic of the acid properties of our new colouring-matters, their use is not restricted to animal fibres, for some of the new sulphato dyes will dye cotton from the neutral or alkaline bath whilst some are suited for use in the manufacture of lakes and pigments. Others again possess mordant dyeing properties and can be applied, for example, upon chromed wool, or in calico-printing.

The new dyestuffs containing sulphato groups are thus produced by the following alternative methods:—

1. They can be built up from one or more components containing sulphato-ethyl, sulphato-propyl, sulphato-butyl, or sulphato glycerol groups.
2. They can be built up from one or more components containing one or more oxyalkyl groups attached to nitrogen which oxyalkyl groups are converted into sulphato-alkyl groups by treatment of the finished dyestuff with sulphuric acid.
3. The conversion of the oxyalkyl group into the sulphato group can be effected at an intermediate stage in the preparation, for example, by treatment with sulphuric acid of a leuco compound obtained from components containing one or more oxyalkyl groups.
4. They can be built up from components containing both oxyalkyl and sulphato groups, the former of which can also be converted into sulphato groups by treatment of the finished dyestuff or an intermediate stage of the same with sulphuric acid.
5. They can be produced by the introduction of sulphato groups into such finished dyestuffs or their leuco products as contain primary or secondary amido groups, by reacting these dyestuffs or their leuco bodies with ethylene chlorhydrin or oth. hydrin and subsequently with sulphuric acid, or with the product of reaction of a chlorhydrin with sulphuric acid, such as chlorethyl hydrogen sulphate.
6. In all cases in which the use of chlorhydrins is specified they may be replaced by bromhydrins, although the former are to be preferred.

The following examples will help to further illustrate the nature of the invention as indicating the way in which it can be applied in a few cases, but we wish to guard against the impression that these examples or even their immediate analogues exhaust the cases to which the invention can be applied, nor on the other hand do we wish to confine ourselves to the manner of working in the particular cases chosen as examples.

EXAMPLE I.—*Sulphato-ethylaniline or phenylamidoethyl-sulphuric acid.*

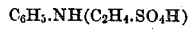

The following are two alternative methods of preparation—(a) 10 parts of oxythylaniline (obtained by the method of of D. R. P. 163043) are added to 20–30 parts of concentrated sulphuric acid. The mixture becomes warm, and on cooling sets to a thick oil which after a short time is found to be completely soluble in dilute aqueous alkalies. The substance can be obtained as its sodium salt by neutralisation with milk of lime, filtration from calcium sulphate, conversion of the calcium salt into the sodium salt by sodium carbonate and evaporation to crystallization. It is a white solid which is easily soluble in water. It is usually more convenient to neutralize with soda and use the solution directly.

(b) 10 parts of ethylene chlorhydrin are added cautiously with cooling to 20–30 parts of concentrated sulphuric acid and the mixture allowed to stand for some hours. It is then diluted with water, carefully neutralized with sodium carbonate and boiled for some hours with 23 parts of aniline. After making just alkaline and removing the excess of aniline by steam distillation, a solution is obtained which contains the sodium salt of the sulphato-ethylaniline, identical with the product obtained by the previously described method.

EXAMPLE II.—*Disulphatodiethylaniline.*

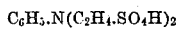

10 parts of dioxy-diethylaniline are added to 20–30 parts of concentrated sulphuric acid, and the mixture warmed and stirred until the solid has dissolved and a test portion is completely soluble in dilute alkali. The whole is then diluted with water and neutralized with soda. The solution can be employed directly for further condensations.

EXAMPLE III.—*Sulphato-ethyl-o-toluidine.*

This is prepared from oxyethyl-o-toluidine by exactly analogous methods to the foregoing.

In an analogous manner, other aromatic amines or amido compounds containing an oxyalkyl group united to nitrogen, may be sulphated by treatment with sulphuric acid, hot or cold, for longer or shorter periods, according to the ease with which sulphation takes place in the compound under treatment. This varies considerably and it is frequently noticed that those compounds to which a quinonoid structure can be assigned react more readily than those of purely benzenoid character.

EXAMPLE IV.—*Sodium sal of disulphato-diethyl-p-amino-azo-benzene.*

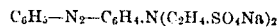

A solution containing 37.5 parts of disulphato-diethylaniline is prepared as in Example II. To this, when cooled, is added with stirring a solution produced by the diazotisation of 10 parts of aniline, mineral acid being removed by the addition of sodium acetate. When coupling is complete the solution is made alkaline and the dyestuff salted-out. It is obtained as a dull yellow powder which dyes wool a pure yellow from an acid bath.

EXAMPLE V.—*Sodium salt of p-sulphobenzene-azo-p-sulphato-ethylamino-o-toluene.*

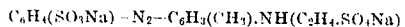

A solution containing 10 parts of sulphato-ethyl-o-toluidine is prepared according to Example III above. To this is added the solution produced by dissolving 10 parts of crystallized sodium sulphanilate in water and diazotising. Coupling takes place in mineral acid-free solution. After salting-out, the dyestuff is obtained as an orange powder which dyes wool yellow from an acid bath.

EXAMPLE VI.—*Sodium salt of p-nitrobenzene-azo-p-disulphato-diethylamino-benzene.*

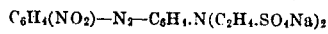

The following are two alternative methods of preparation (*a*) A solution containing 23.1 parts of the sodium salt of disulphato-diethylaniline is prepared as in Example II. To this is added a solution prepared by diazotising 10 parts of p-nitraniline. Coupling takes place in acetic acid solution and the resulting dye is salted-out. It is obtained as a red powder which dyes wool scarlet from an acid bath.

(*b*) 12.3 parts of dioxy-ethylaniline are dissolved in dilute acid and coupled with the diazo solution obtained from 10 parts of p-nitraniline. An insoluble red powder is obtained which is collected and dried. On treating one part of this powder with 2–3 parts of concentrated sulphuric acid until a test portion is soluble in dilute alkali, pouring into water and salting-out, a product is obtained identical with the preceding.

EXAMPLE VII.—*Sodium salt of naphthalene-alpha-azo-p-disulphato-diethylaminobenzene.*

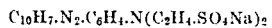

12.4 parts of di-oxyethyl-aniline are sulphated as in Example II. The solution of the sodium salt is cooled and to it is added at 0°–5° C. a solution obtained by diazotising 10 parts of alpha-naphthylamine. Free mineral acid is removed by the addition of sodium acetate and the mixture is stirred until it no longer gives a colour reaction with H-Acid. The dyestuff is then salted-out, collected and dried. The product is a dark brown powder which dyes wool orange from an acid bath. The dyestuff may also be produced, though less advantageously, by coupling di-oxyethyl-aniline with diazotised alpha-naphthylamine and subsequent sulphation of the product.

EXAMPLE VIII.—*Sodium salt of 4-sulphonaphthalene-1-azo-p-disulphato-diethylamino-benzene.*

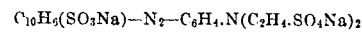

A solution of 11 parts of disulphato-diethylaniline is prepared as in Example II. To this is added the diazo compound produced from 10 parts of crystallized sodium naphthionate, stirring being continued until coupling is complete. The dyestuff, after salting-out, forms an orange powder which dyes wool orange from an acid bath.

EXAMPLE IX.—*Sodium salt of p-disulphato-diethylaminobenzene-azo-B-naphthol.*

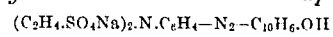

To an acid solution of 22.1 parts of disulphato-diethylaniline a solution of nitrite is added with cooling and stirring. A red solution of the nitroso hydrochloride is obtained, and when all the amine has been converted, this is reduced in acid solution with zinc dust. After removal of excess of zinc, nitrite is again added to the clear solution and the diazo solution thus produced is coupled with 10 parts of B-naphthol. The product is a dark powder which dyes wool maroon from an acid bath.

EXAMPLE X.—*Disulphato-diethyldiamino-ditolyl-phenyl carbinol.*

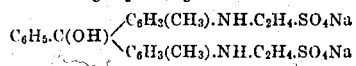

10 parts of the dyestuff obtained according to D. R. P. No. 278423 by condensing benzaldehyde with oxyethyl-o-toluidine and subsequent oxidation with lead peroxide, is added cautiously to 20–30 parts of cold concentrated sulphuric acid, care being taken that the temperature does not rise unduly. The homogeneous solution is allowed to stand until the product is soluble in cold dilute alkali. The solution is then diluted and the dyestuff salted-out as a dark powder with a copper reflex. It dyes wool a green blue from an acid bath.

EXAMPLE XI.

Basic dyestuffs obtained by the condensation of benzaldehyde with oxyethyl-ethylaniline; o-chlorbenzaldehyde with oxyethyl-ethyl-aniline; or o-chlorbenzaldehyde with oxyethyl-o-toluidine, are treated in exactly the manner of the foregoing example, producing dyes presumably having the structures.

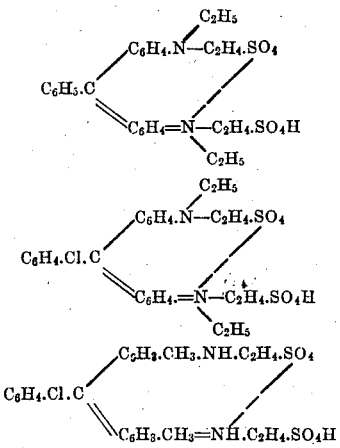

They dye wool from an acid bath giving very level yellowish green, bluish green and sky blue shades respectively.

It is possible to sulphate the leuco bases in all the four preceding examples before oxidation to the carbinol, but the method of working described above is regarded as preferable.

EXAMPLE XII.—*Internal salt of disulphato-diethyl - diethyl - dimethyl - triamino - triphenyl carbinol.*

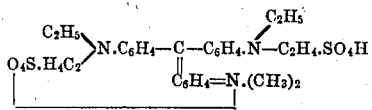

17 parts of dioxyethyl-diethyl-diamino-diphenyl-methane obtained by condensing oxyethyl-ethyl-aniline hydrochloride with formaldehyde, are heated with 100 parts of sulphuric acid, sp. gr. 1.84, at a temperature of 100° C. until a test no longer gives a precipitate with alkali. The time required is about 4 hours. The solution is cooled, poured into 1,000 parts of water and lime or chalk added until neutrality to Congo paper is reached. The calcium sulphate is filtered off and extracted with hot water. The filtrate and washings having been brought to 35° C., 3 parts of dimethyl aniline are added with continuous stirring. After 15 minutes a strong solution of 6 parts of potassium bichromate is run in and the whole stirred at 35–40° C. for 24 hours. The liquid is filtered from the chromium oxide and the dyestuff thrown out with salt, filtered and dried at 100° C. It is obtained as a copper coloured powder and dyes wool in extremely level violet shades from an acid bath.

Dyes of the same type differing slightly in shade from the above are obtained by the use of 3.2 parts of ethyl-o-toluidine or 3.4 parts of diethyl-aniline in the above example.

EXAMPLE XIII.—*Internal salt of disulphato-diethyl-tetramethyl triamino-triphenyl carbinol.*

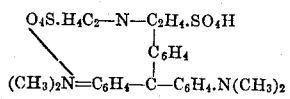

13.5 parts of tetramethyl-diamino-diphenyl carbinol (Michler's hydrol) are heated with 9.1 parts of dioxy-diethyl-aniline and 60 parts of 30% sulphuric acid on the water bath for 5 hours. The mixture is then made faintly alkaline with a 10% solution of caustic soda and the leuco base of the dyestuff filtered off, washed and dried.

21.65 parts of the dry leuco compound are heated to 100° C. with 110 parts of sulphuric acid 1.84 sp. gr. until a test portion gives a clear solution in alkali. The solution is poured into 1000 parts of water and lime or chalk added until the acid reaction to Congo paper has disappeared. The calcium sulphate is removed and well washed with hot water. The filtrate is cooled to below 5° C., strongly stirred while there are added to it 40 parts of 30% lead peroxide paste, followed by 53 parts of 10% hydrochloric acid. Stirring is continued for two hours. The sparingly soluble dyestuff is then collected, dried at 100° C., and ground. It forms a copper coloured powder and dyes wool a clear purple from an acid bath.

EXAMPLE XIV.—*Disulphato - diethyl - diethyl - diamino - oxy - triphenyl carbinol carboxylate.*

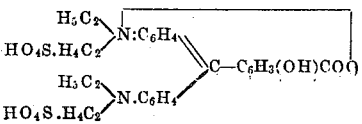

10.5 parts of diethyl-dioxyethyl-diamido-diphenyl methane omega sulphonic acid are heated with 70 parts of sulphuric acid monohydrate to 100° C. for 2 hours; 3.5 parts of salicylic acid are then added and the mixture heated for a further 3 hours. It is then poured into 400 parts of water and lime or chalk added until the liquid is no longer acid to Congo red paper. The calcium sulphate formed is filtered off and extracted. The filtrate is cooled to below 10° C. and 20 parts of a 30% lead peroxide paste added, followed by 27 parts of a 10% solution of hydrochloric acid, the whole being stirred for two hours. The liquid is then heated to 80° C., 4 parts of sodium sulphate added, the lead is filtered off as sulphate, and the dye precipitated by the addition of salt. The product is obtained as a violet powder which dyes wool by the after-chrome method a bright reddish-violet shade, and is valuable in calico printing with chrome mordant thickening.

By substituting o-cresotinic acid for salicylic acid in this example, a bright violet dyestuff of similar properties is obtained. By substituting benzoic acid, o-toluic acid, naphthalene sulphonic acid, or R-salt, acid dyestuffs of green shade are produced.

The omega sulphonic acid employed for these condensations is prepared as follows:—
165 parts of oxethyl-ethyl-aniline is agitated for 3 days at 100° C. with 43.2 parts of formaldehyde (40% solution by volume) and 140 parts of water containing 2 parts of sulphuric acid. After cooling the methane base is filtered off and dried. 342 parts of the mathane base are dissolved in 345 parts of 80% formic acid, diluted with 1200 parts of water, cooled to 0° C. and oxidized by addition of lead peroxide paste containing 263 parts $PbO_2$.

After 45 minutes stirring, 220 parts sodium sulphate are added and the solution is filtered from lead sulphate. The filtrate is made alkaline, and the precipitated hydrol is filtered off. The latter is redissolved in 345 parts of 80% formic acid and as little water as possible, and to it is added 80 parts of sodium bisulphite solution (38%–39%). The mixture is heated to 60–65° C. for 4 hours, allowed to cool and made faintly alkaline with caustic soda. After filtration from any tarry residue the solution is filtered and saturated with salt. The sodium salt of the omega sulphonic acid separates on standing. From this the free acid is obtained by redissolving in 1300 c. c. of twice normal hydroloric acid and neutralizing until only a faint acidity to litmus remains, when on standing the product separates.

In the condensations in which a diphenyl-methane-omega-sulphonic acid is used, this may be replaced by the corresponding carbinol (hydrol) of which it is the bisulphite compound.

EXAMPLE XV.—*Internal salt of disulphato-diethyl-dimethyl-diamino phenazonium.*

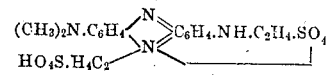

A basic azine dyestuff is prepared by the action of nitroso-dimethylaniline on sym-dioxyethyl-m-phenylene-diamine, as for example by the method described in Example IX of British patent specification No. 22991 of the 30th August 1921. The product so obtained is treated with cold sulphuric acid, sp. gr. 1.84, under the conditions described in Example X above. The resulting acid dyestuff is a black powder, very soluble in water and dyeing wool a fast reddish-blue from an acid bath.

EXAMPLE XVI.—*Sulphato-ethylamino-dioxy-toluphenoxazonium carboxylic acid.*

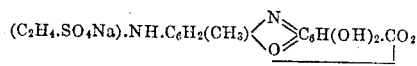

A dyestuff of the gallocyamide type is prepared by the usual method from p-nitroso-oxyethyl-o-toluidine and gallic acid (see Examples I and II of British patent specification No. 22991 of the 30th August 1921). 10 parts of the dried product are added to 20–30 parts of concentrated sulphuric acid which is gently warmed until a sample gives no precipitate with tannin reagent. After dilution and salting out, the dyestuff is obtained as a black powder which dyes wool a deep blue from an acid bath, and a violet blue upon wool mordanted with chromium oxide.

EXAMPLE XVII.—*Internal salt of disulphato-diethyl-benzyl-diamino-naphthophenoxazine.*

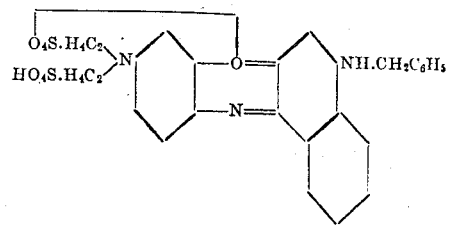

A basic dyestuff is prepared by the condensation of nitroso-dioxyethyl-m-aminophenol with benzyl-alpha-napthylamine, as for example by the method described in Example V of British patent specification No. 22991 of the 30th August 1921. 10 parts of this compound are dissolved in 20–30 parts of cold sulphuric acid, sp. gr. 1.84, and allowed to stand until a test dissolves to a clear red solution in alkali. It is then poured into brine and ice, the precipitated dye filtered off and the filter cake dissolved with stirring in 10% caustic soda. The solution is filtered to remove traces of unsulphated base and poured into a slight excess of hydrochloric acid. The complete precipitation of the dye is brought about by a little salt. The dye is collected and dried, yielding a bronzy powder, readily soluble in hot water and dyeing wool a pure blue from an acid bath.

EXAMPLE XVIII.—*Internal salt of disulphato-diethyl-diamido-dituluthiazine.*

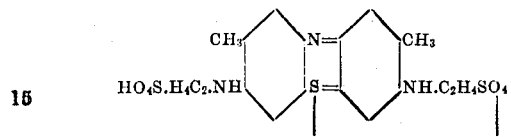

EXAMPLE XIX.—*Oxazine dyestuff of the constitution.*

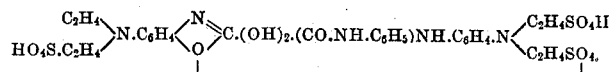

By the condensation of nitroso-oxyethyl-ethylaniline with gallanilide a basic gallocyanine is obtained, which is further condensed with asym-dioxyethyl-p-phenylene diamine yielding a sparingly soluble product (see Examples II and III of British patent specification No. 22991 of the 30th August 1921). 10 parts of this product are then treated with 20–30 parts of concentrated sulphuric acid, warming if necessary to complete solution. Care must be exercised to prevent the acid from attacking the nucleal hydroxy groups or the mordant dyeing properties of the sulphato dye are impaired. When a test sample is completely soluble in water or dilute acid, the sulphuric acid solution is diluted, neutralized with caustic soda and the sodium salt thrown out with common salt. It should dissolve to a deep blue solution in water and give no precipitate on acidifying. It dyes wool a pure blue from an acid bath and can be chromed to give rather a greener shade. It can be applied for printing purposes.

EXAMPLE XX.—*Sodium salt of ditolyl-disaso-bi-disulphato-diethylaminobenzene.*

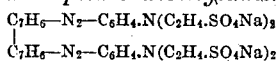

A solution of 10 parts of disulphato-diethylaniline is added to the tetrazo solution produced from 5.8 parts of tolidine. During coupling, the solution is gradually made alkaline and on completion the sodium salt is thrown out with common salt. It is obtained as an orange powder and dyes cotton direct in orange shades.

EXAMPLE XXI.—*Disulphato-propyl-amino-benzene-azo-p-nitrobenzene.*

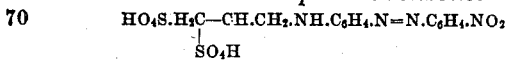

10 parts of dioxypropylaniline, obtained

A basic thiazine dyestuff is prepared from oxyethyl-o-toluidine, as for example by the method described in Example XIII of British patent specification No. 22991 of the 30th August 1921. This, preferably in the form of zinz-free hydrochoride is dissolved in 3 parts of cold concentrated sulphuric acid with agitation. When the reaction is complete, the solution is poured upon ice, and the sodium salt precipitated by the addition of common salt. It dyes wool a bright reddish-blue from an acid bath.

by boiling aniline in excess with an aqueous solution of glycerine chlorhydrin, are dissolved in dilute acid and coupled with the diazo solution obtained from 12 parts of p-nitraniline. The coupling product is collected and dried. It is then sulphated in the manner indicated in Example VI B, and yields a dye of almost identical properties.

EXAMPLE XXII.—(*Sulphation by means of chlorosulphonic acid.*)

10 parts of di-oxyethyl-aniline are rapidly stirred and cooled whilst there is carefully added 13 parts of chlorsulphonic acid. A vigorous reaction takes place with disengagement of hydrochloric acid gas. When complete a sticky mass is formed which solidifies on cooling. It is almost pure sulphato acid, which can be used directly by dissolving in water and neutralizing with soda.

EXAMPLE XXIII.—*Sodium salt of benzene-azo-disulphato-propylamido benzene.*

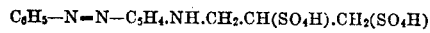

10 parts of dioxypropylaniline, obtained as above described, are treated with 14 parts of chlorsulphonic acid as in the previous example. The semi-solid mass produced is dissolved in water, neutralized with sodium carbonate, and coupled with a solution of diazobenzene chloride obtained from 4.6 parts of aniline. The dyestuff is salted-out and separated. It dyes wool yellow from an acid bath.

What we claim is:—

1. As new products the N-sulphato-alkyl compounds which contain at least one alkyl sulphuric acid group attached to nitrogen and on boiling with caustic alkalies split off the SO$_4$H groups as alkaline sulphate.

2. As new products the N-sulphato-ethyl compounds which contain at least one ethyl sulphuric acid group attached to nitrogen N-C$_2$H$_4$OSO$_3$H and on boiling with caustic alkalies split off the SO$_4$H groups as alkaline sulphate.

3. As new compounds acid dyestuffs which are N-sulphato-alkyl compounds containing at least one alkyl sulphuric acid group which upon boiling with caustic alkali split off the SO$_4$H groups as alkaline sulphate.

4. As new compounds acid dyestuffs which are N-sulphato-ethyl compounds containing at least one ethyl sulphuric acid group which upon boiling with caustic alkali split off the SO$_4$H groups as alkaline sulphate.

5. As new compounds acid triarylmethane colouring matters which are N-sulphato-alkyl compounds containing at least one alkyl sulphuric acid group attached to nitrogen and which upon treatment with caustic alkalies split off the SO$_4$H groups as alkaline sulphate.

6. As new compounds acid triarylmethane colouring matters which are N-sulphato-ethyl compounds containing at least one ethyl sulphuric acid group attached to nitrogen and which upon treatment with caustic alkalies split off the SO$_4$H groups as alkaline sulphate.

7. As new compounds acid triphenylmethane colouring matters which are N-sulphato-alkyl compounds containing at least one alkyl sulphuric acid group attached to nitrogen and which upon treatment with caustic alkalies split off the SO$_4$H groups as alkaline sulphate.

8. As new compounds acid triphenlymethane colouring matters which are N-sulphato-ethyl compounds containing at least one ethyl sulphuric acid group attached to nitrogen and which upon treatment with caustic alkalies split off the SO$_4$H groups as alkaline sulphate.

9. As new compounds acid mordant dyeing triarylmethane colouring matters containing a carboxy group which are N-sulphato-alkyl compounds containing at least one alkyl sulphuric acid group attached to nitrogen and which upon treatment with caustic alkalies split off the SO$_4$H groups as alkaline sulphate.

10. As new compounds acid mordant dyeing triarylmethane colouring matters containing a carboxy group which are N-sulphato-ethyl compounds containing at least one ethyl sulphuric acid group attached to nitrogen and which upon treatment with caustic alkalies split off the SO$_4$H groups as alkaline sulphate.

11. As new compounds green acid mordant dyeing triphenylmethane colouring matters which contain a carboxy group and are N-sulphato-ethyl compounds containing at least one ethyl sulphuric acid group attached to nitrogen and which upon treatment with caustic alkalies split off the SO$_4$H groups as alkaline sulphate.

In testimony whereof we have signed our names to this specification.

ARTHUR GEORGE GREEN.
KENNETH HERBERT SAUNDERS.